United States Patent
Wawrzynowicz

(10) Patent No.: US 10,636,047 B2
(45) Date of Patent: Apr. 28, 2020

(54) SYSTEM USING AUTOMATICALLY TRIGGERED ANALYTICS FOR FEEDBACK DATA

(71) Applicant: Hartford Fire Insurance Company, Hartford, CT (US)

(72) Inventor: Philip Wawrzynowicz, Lebanon, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 1109 days.

(21) Appl. No.: 14/848,951

(22) Filed: Sep. 9, 2015

(65) Prior Publication Data

US 2017/0068976 A1 Mar. 9, 2017

(51) Int. Cl.
| G06Q 30/02 | (2012.01) |
| H04M 3/51 | (2006.01) |
| H04M 7/00 | (2006.01) |
| G06Q 30/00 | (2012.01) |

(52) U.S. Cl.
CPC ....... *G06Q 30/0203* (2013.01); *G06Q 30/016* (2013.01); *H04M 3/5175* (2013.01); *H04M 3/5183* (2013.01); *H04M 7/006* (2013.01)

(58) Field of Classification Search
CPC ............ G06Q 30/0203; G06Q 30/016; H04M 3/5175; H04M 3/5183; H04M 7/006
See application file for complete search history.

(56) References Cited

U.S. PATENT DOCUMENTS

| 7,940,897 | B2 | 5/2011 | Khor et al. |
| 8,112,306 | B2 | 2/2012 | Lyerly et al. |
| 8,117,064 | B2 | 2/2012 | Bourne et al. |
| 8,204,884 | B2 | 6/2012 | Freedman et al. |
| 8,345,831 | B2 | 1/2013 | Anderson |
| 8,917,829 | B2 | 12/2014 | Anderson |
| 2015/0032746 | A1 | 1/2015 | Lev-Tov et al. |
| 2015/0071419 | A1 | 3/2015 | Anderson |
| 2015/0120390 | A1* | 4/2015 | Pace ............... G06Q 30/0203 705/7.32 |
| 2015/0170228 | A1* | 6/2015 | Wheeler ........... G06Q 30/0282 705/319 |

* cited by examiner

*Primary Examiner* — Sujay Koneru
*Assistant Examiner* — Mohamed N El-Bathy
(74) *Attorney, Agent, or Firm* — Buckley, Maschoff & Talwalkar LLC

(57) ABSTRACT

A customer database system may store historic customer satisfaction information. A CSR terminal may facilitate an interaction between a service representative and a first customer, and a survey platform may: (i) detect that the CSR terminal is currently interacting with the first customer and that the first customer has an entry in the customer database system, and (ii) automatically trigger an analytics action at the CSR terminal. A relational database may receive solicited customer feedback information along with a structured escalation level category entered via the analytics action. The solicited customer feedback information may be parsed into unstructured text, and a big data application platform may: (i) execute an algorithm to assign a sub-category to the first customer interaction based on the unstructured parsed text, and (ii) assign the solicited customer feedback to positive, neutral, and/or negative sentiment pools.

16 Claims, 16 Drawing Sheets

| CSR ID 1302 | INSURANCE POLICY ID 1304 | SURVEY ID 1306 | CATEGORY/ SUBCATEGORY 1308 | SENTIMENT 1310 |
|---|---|---|---|---|
| CSR_1001 | P123456713 | S_10001 | MANAGER/ RATE | NEUTRAL |
| CSR_1001 | P234567899 | S_10002 | CONSUMER AFFAIR/ PHONE PROBLEM | POSITIVE |
| CSR_1001 | P987654321 | S_10003 | MANAGER/ WEB DESIGN | POSITIVE |
| CSR_1002 | 43215678 | S_10004 | MANAGER/ IVR DESIGN | NEGATIVE |
| CSR_1003 | 876543219 | S_10005 | IMPROVEMENT/ WEB DESIGN | NEUTRAL |

FIG. 13

SYSTEM USING AUTOMATICALLY TRIGGERED ANALYTICS FOR FEEDBACK DATA

FIELD

The present invention relates to computer systems and, more particularly, to computer systems using automatically triggered analytics actions for solicited feedback data.

BACKGROUND

An enterprise may interact with a customer, such as by having a customer service representative speak with the customer during a telephone call and/or interact with a customer via a web chat interface. Such interactions may provide the enterprise with an opportunity to receive customer feedback information that could be used to improve services, products and/or procedures. For example, a customer who previously indicated that he or she is not satisfied with some aspects of an insurance experience might be able to suggest ways in which the process could be improved. It can be difficult, however, to determine the best customers from which this type of information should be solicited. Moreover, understanding customer's preferences can be difficult—especially when there are a substantial number of customer interactions with various customer service representatives (e.g., an insurance enterprise might receive thousands of customer telephone calls and or handle a similar number of chat interfaces on a daily basis). It would therefore be desirable to provide systems and methods to facilitate an analysis of solicited customer feedback in an automated, efficient, secure, and accurate manner.

SUMMARY

According to some embodiments, systems, methods, apparatus, computer program code and means may facilitate an analysis of solicited customer feedback. In some embodiments, a customer database system may store historic customer satisfaction information. A customer service representative terminal may facilitate an interaction between a service representative and a first customer, and a survey platform may: (i) detect that the customer service representative terminal is currently interacting with the first customer and that the first customer has an entry in the customer database system, and (ii) automatically trigger an analytics action at the customer service representative terminal. A relational database may receive solicited customer feedback information along with a structured escalation level category entered via the analytics action. The solicited customer feedback information may be parsed into unstructured text, and a big data application platform may: (i) execute an algorithm to assign a sub-category to the first customer interaction based on the unstructured parsed text, and (ii) assign the solicited customer feedback to positive, neutral, and/or negative sentiment pools.

Some embodiments provide: means for storing, for each of a plurality of customers of an enterprise, historic customer satisfaction information in a customer database system; means for facilitating, by a customer service representative terminal, an interaction between a customer service representative and a first customer; means for detecting, by a survey platform coupled to the customer database system and the customer service representative terminal, that the customer service representative terminal is currently interacting with the first customer and that the first customer is associated with an entry in the customer database system; responsive to the detection, means for automatically triggering an analytics action at the customer service representative terminal; means for receiving, by a relational database, solicited customer feedback information from the customer service representative terminal, along with a structured escalation level category entered via the analytics action; means for automatically parsing the solicited customer feedback information into unstructured text; means for executing, by a big data application platform coupled to the relational database, an algorithm to assign a sub-category to the first customer interaction based on the unstructured parsed text; and means for recording an indication of the solicited customer feedback into one of a positive sentiment pool, a neutral sentiment pool, and a negative sentiment pool.

A technical effect of some embodiments of the invention is an improved, secure, and computerized method to facilitate an analysis of solicited customer feedback data. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 13 is a tabular portion of a big data results database according to some embodiments.

DETAILED DESCRIPTION

Note that the present invention provides significant technical improvements to facilitate an analysis of customer feedback information. The present invention is directed to more than merely a computer implementation of a routine or conventional activity previously known in the industry as it significantly advances the technical efficiency, access and/or accuracy of analysis of customer feedback information by implementing a specific new method and system as defined herein. The present invention is a specific advancement in the areas of customer communication by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized enterprise, client and/or third party analysis systems, networks and subsystems. For example, in the present invention information may be transmitted from a customer service representative in an easy to comprehend manner and/or valuable and helpful information about a customer may be analyzed and accurately collected by an enterprise.

An enterprise may interact with a customer, such as by having a customer service representative speak with the customer during a telephone call or interact with the customer via an online chat interface. Such interactions may provide the enterprise with an opportunity to receive customer feedback information that could be used to improve insurance products and/or procedures. For example, a customer who previously indicated that he or she is not satisfied with an interactive voice menu might be able to suggest ways in which the voice menu could be improved. It can be difficult, however, to determine the best customers from which this type of information should be solicited. Moreover, understanding customer's preferences can be difficult—especially when there are a substantial number of customer interactions with various customer service representatives (e.g., an enterprise might receive thousands of customer telephone calls and/or chat interactions on a daily basis). It would therefore be desirable to provide systems and methods to facilitate an analysis of solicited customer feedback in an automated, efficient, and accurate manner.

Figure 1:
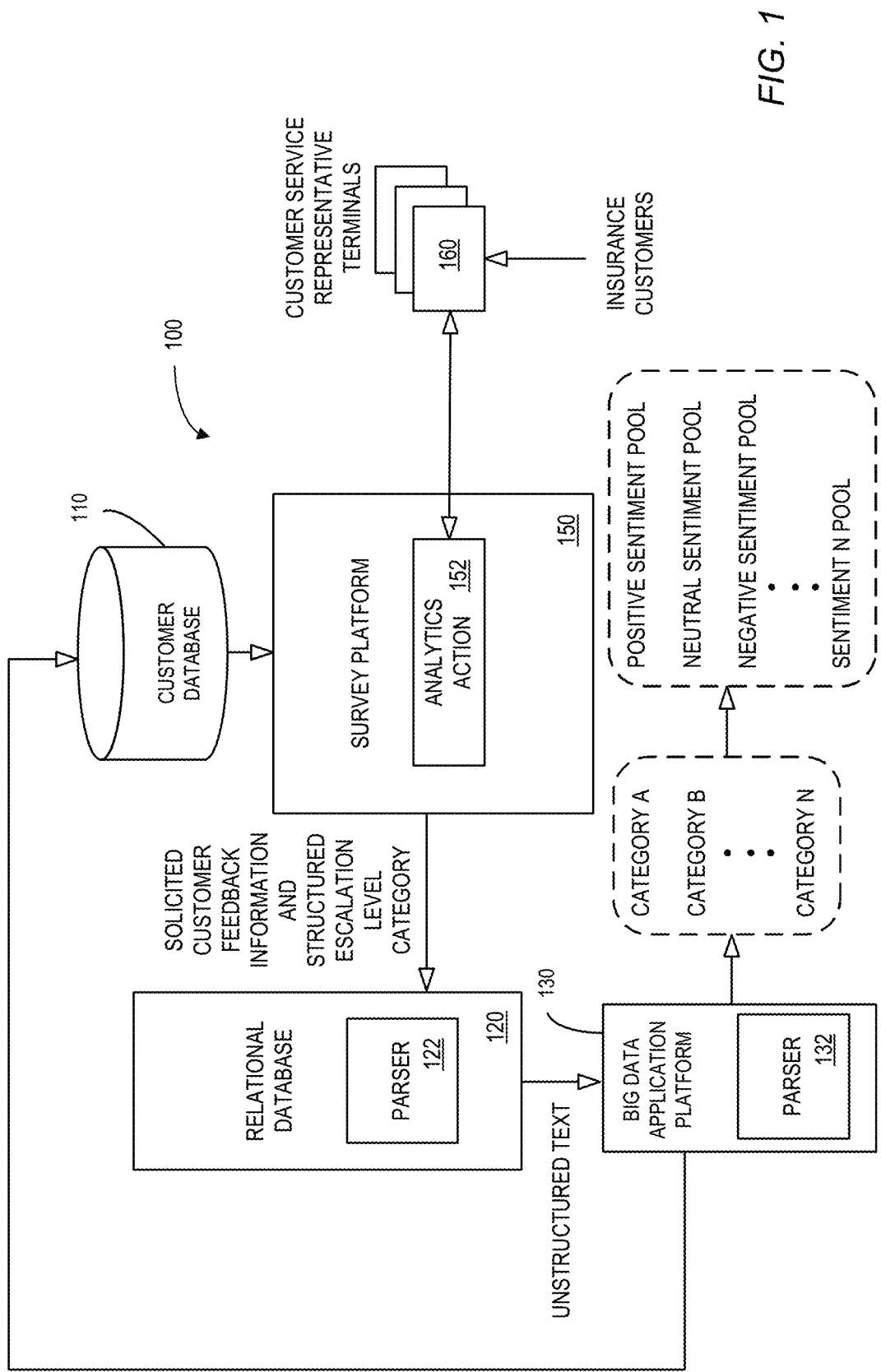
FIG. 1 is block diagram of a system according to some embodiments of the present invention.

FIG. 1 is block diagram of a system 100 according to some embodiments of the present invention. In particular, the system 100 includes a survey platform 150 that may access a customer database 110, such as one associated with a Customer Relationship Management ("CRM") database or application. The customer database 110 may periodically update (e.g., on a daily basis) information about insurance policies, questionnaire responses, social media posts, metadata, etc. The survey platform 150 may also communicate with a set of customer service representative terminals 160 that are used to interact with insurance customers. The customer service representative terminals 160 may, for example, be used to field telephone calls from customers and/or to participate in online chat sessions with customers. According to some embodiments, the survey platform 150 may use a Graphical User Interface ("GUI") to render user displays for the customer service representative terminals 160. In some cases, such as when the insurance customer database 110 stores an indication of prior customer dissatisfaction, an analytics action 152 might be automatically triggered at the survey platform 150. As will be described, the analytics action 152 might be used to receive specific types of information via the customer service representative devices (e.g., including, in some cases, a selected escalation level category).

The survey platform 150 may provide information, such as solicited customer feedback information and a structured escalation level category to a relational database 120. The relational database 120 may be associated with a speech-to-text or other type of parser 122 that provides unstructured text to a big data application platform 130. The big data application platform 130 may then use algorithms and/or analytics to assign the customer interaction to one of a positive sentiment pool, a neutral sentiment pool, and a negative sentiment pool. In particular, the big data application platform 130 may include a parser 132 that automatically performs category parsing and sentiment parsing (e.g., and a single customer interaction might be associated with multiple categories and/or sentiments). According to some embodiments, information from the big data application platform 130 may be fed back to the customer database 110. Note that the big data application platform 130 might be associated with Hadoop, NoSQL, Watson, Mango, or any other appropriate application.

The survey platform 150 and/or other devices within the system 100 might be, for example, associated with a Personal Computer ("PC"), laptop computer, smartphone, an enterprise server, a server farm, and/or a database or similar storage devices. The survey platform 150 may, according to some embodiments, be associated with an insurance provider.

According to some embodiments, an "automated" survey platform 150 may facilitate the collection and analysis of feedback information from an insurance customer. For example, the survey platform 150 may automatically trigger an analytics action 152 to help facilitate the collection of such information. As used herein, the term "automated" may refer to, for example, actions that can be performed with little (or no) intervention by a human.

As used herein, devices, including those associated with the survey platform 150 and any other device described herein may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The survey platform 150 may store information into and/or retrieve information from the customer database 110. The customer database 110 might be associated with, for example, an insurance company, an underwriter, or a claim analysis tool and might also store data associated with past and current insurance policies and/or claims. The customer database 110 may be locally stored or reside remote from the survey platform 150. As will be described further below, the customer database 110 may be used by the survey platform 150 to facilitate interactions with customers. According to some embodiments, the survey platform 150 communicates information associated with customers to a remote device and/or to an automated system, such as by transmitting an electronic file to an underwriter device, an insurance agent or analyst platform, an email server, a workflow management system, a predictive model, a map application, etc.

Although a single survey platform 150 is shown in FIG. 1, any number of such devices may be included. Moreover, various devices described herein might be combined according to embodiments of the present invention. For example, in some embodiments, the survey platform 150 and relational database 120 might be co-located and/or may comprise a single apparatus.

Figure 2:
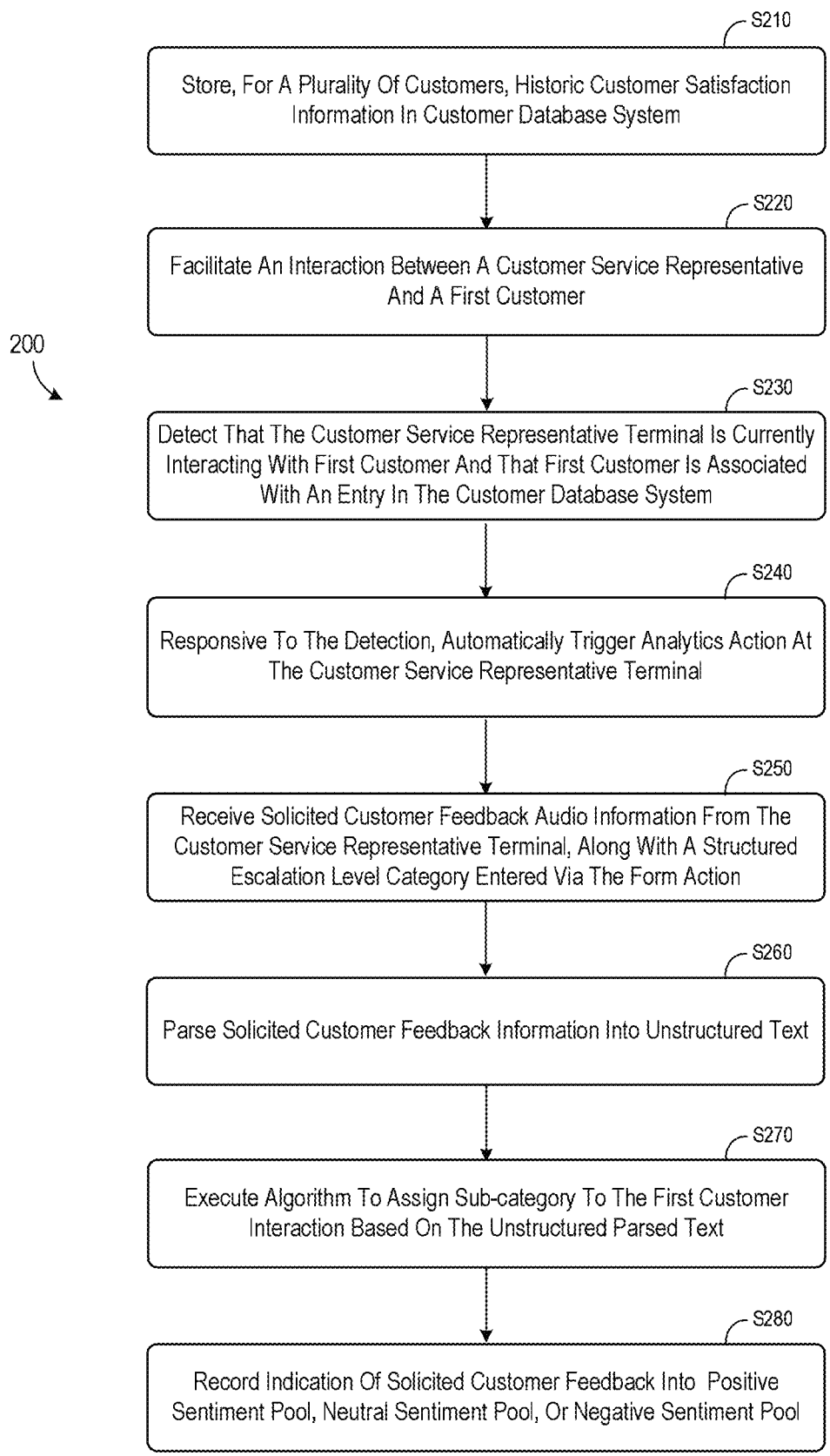
FIG. 2 illustrates a method that might be performed in accordance with some embodiments.

Note that the system 100 of FIG. 1 is provided only as an example, and embodiments may be associated with additional elements or components. According to some embodiments, the elements of the system facilitate the collection and/or analysis of feedback information from insurance customers. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, historic customer satisfaction information may be stored, for each of a plurality of customers of an enterprise, in a customer database system. According to some embodiments, the information in the customer database includes information associated with a "net promoter score." By way of example, a net promotor score might be calculated by determining: (i) a number of customers P who are likely to promote the insurance enterprise, and (ii) a number of customers D who are likely to actively discourage others from using the insurance enterprise. The net promotor score might then be set to P minus D. According to some embodiments, customers in the customer database system might be given a score from 1 through 10, with 10 indicating the highest level of satisfaction regarding a previous insurance experience. Note that the customer database might store any type of metadata about a customer, including information about prior transactions, complaints, etc.

At S220, a customer service representative terminal may facilitate an interaction between a customer service representative and a first customer. The interaction between the customer service representative and the first customer might, for example, comprise a telephone call or a text-based online interactive chat. At S230, a survey platform coupled to the customer database system and the customer service representative terminal might detect that the customer service representative terminal is currently interacting with the first customer and that the first customer is associated with an entry in the customer database system. For example, the survey platform might detect that the current caller would give a score of 6 or less (indicating a relatively low level of satisfaction regarding a previous insurance experience). Such customers may, for example, represent those from whom feedback information should be solicited.

At S240, an analytics action may be automatically triggered at the customer service representative terminal. For example, the survey platform might arrange for an automatically triggered analytics action to include a drop-down selection of potential escalation levels and an interaction details field that is automatically pre-populated based on Voice over Internet Protocol ("VoIP") transaction information. According to some embodiments, the automatically triggered analytics action further includes customer feedback text entered by the customer service representative.

At S250, a relational database may receive solicited customer feedback audio information from the customer service representative terminal along with a structured escalation level category entered via the analytics action. The structured escalation level category might indicate, for example, that a manager should review a customer's complaint. According to some embodiments, the relational database may also receive unsolicited customer feedback information.

At S260, the solicited customer feedback information may be automatically parsed into unstructured text (e.g., by a speech-to-text application or any other parser). At S270, a big data application platform coupled to the relational database may execute an algorithm to assign a sub-category to the first customer interaction based on the unstructured parsed text. According to some embodiments, the big data application platform is associated with a Structured Query Language ("SQL") server.

At S280, an indication of the solicited customer feedback may be recorded into one of a positive sentiment pool, a neutral sentiment pool, and a negative sentiment pool. Information about the positive sentiment pool, the neutral sentiment pool, and the negative sentiment pool may then be summarized and included in an automatically generated leadership report. Such a report may, for example, help inform leader of the insurance enterprise about the nature and/or severity of customer feedback information that is being received.

As another example, an enterprise might require direct customer feedback from a subset of customers based on recent transactions. Using metadata from Customer Relationship Management ("CRM") databases, targeted customers can be queried as part of a normal transaction discourse. As still another example, customers may offer constructive feedback directly to a representative without direct solicitation. The representative may be able to accurately and efficiently log the customer's concern into the system.

Figure 3:
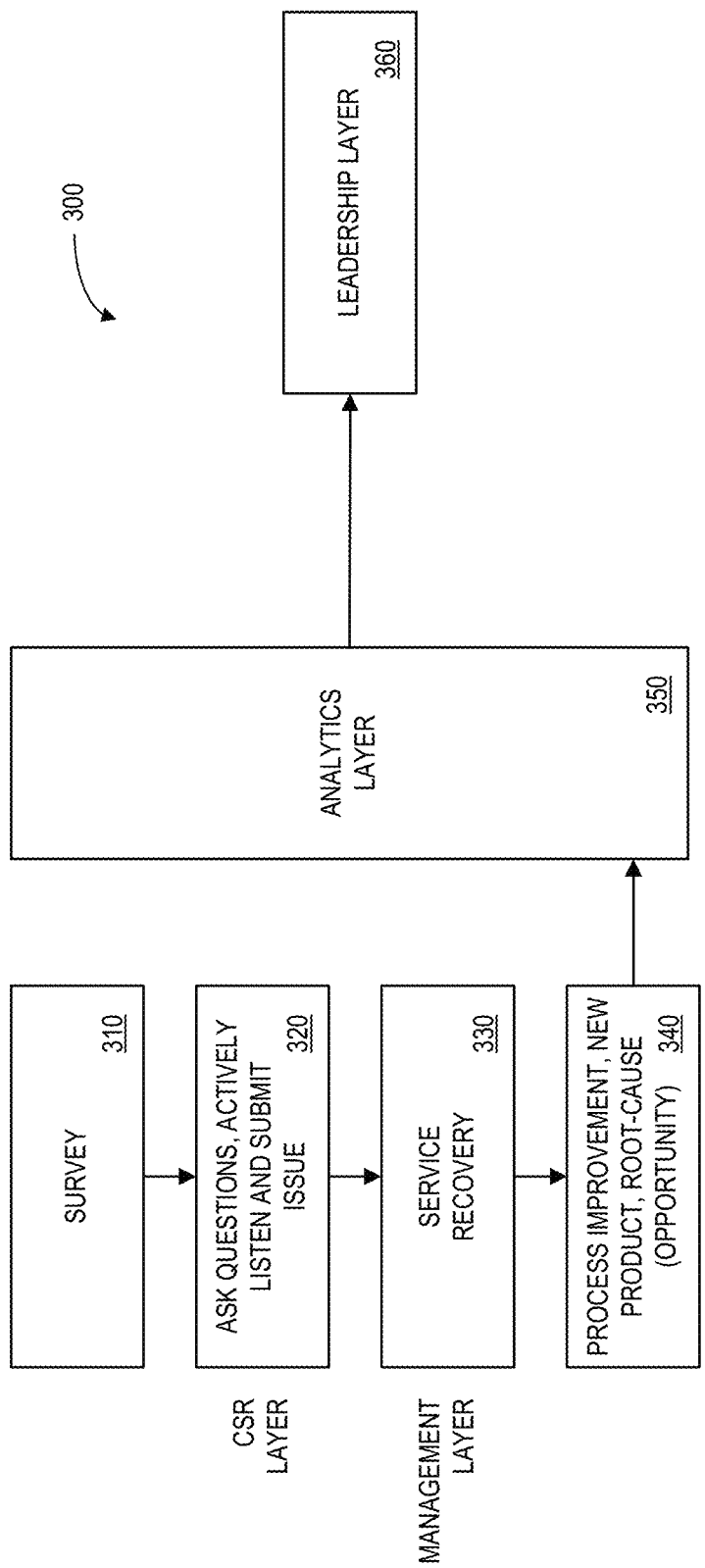
FIG. 3 illustrates a high level system architecture in accordance with some embodiments.

FIG. 3 illustrates a high level system architecture 300 in accordance with some embodiments. As opposed to typical closed-ended questions in customer surveys, which generally occur only after direct interpersonal transactions, some embodiments described herein may use direct just-in-time customer feedback to improve employees, products, and/or procedures. For example, unsolicited customer complaints and solicited feedback may be used to identify and/or develop issues within the transactional level of a conversation.

This data may then be synthesized through speech-to-text analytics and big data algorithms. Such an approach may provide significant insight into customer psyche, preferences, and/or enterprise perception while building rapport with customers. Through advanced analytics, embodiments may develop and/or validate strategic initiatives to better serve the customer base. In addition, embodiments may reinforce a commitment to customers that enterprise wants to listen and take action based on customer feedback.

Some embodiments described herein may comprise an organizational method to organically receive direct customer feedback to support decision tree analysis and Cost Benefit Analysis ("CBA") without follow-up surveys, incurring new third party outreach expenses or otherwise inconveniencing the customer. Additionally, embodiments may build rapport and customer loyalty at the transactional level while providing data, tactical validation, and strategic support to a leadership team. Some embodiments may use hybrid SQL/NoSQL (big data) techniques to build predictive models, Pareto optimal solutions, artificial neural networks, and/or process improvement options for an enterprise. Moreover, embodiments may streamline customer conversations, spotlight pain points, categorize issues, identify customer sentiment, and/or identify areas to improve and/or leverage.

According to some embodiments, an action form may prompt representatives, using known information about a customer's historic experience, to get additional insight on improvement opportunities. As an example, at the close of a call, using customer data analytics, the system 300 could prompt the customer service representative to say, "I noticed you tried using our online bill application today before calling in, how can we improve this site to make it easier to use?" With a speech analytics engine the system 300 may parse and trend what customers say. Some embodiments may also provide an opportunity to get direct customer feedback without incurring new survey costs or making customers perform yet another interaction. Embodiments may quickly get to the root cause of customer problems.

According to some embodiments, the system 300 might also tag unsolicited complaints and compliance exposure issues, as heard by the customer service representative, when there is a potential risk or exposure during the course of a conversation. Once flagged, the contact in question may be available for review in a call recording application for playback. Additionally, an automated communication can be pushed to unit managers, a legal department, or compliance officers for follow-up action. This data can also be processed by internal NoSQL (big data) application for strategic review.

In general, the system 300 includes survey information 310 that may be associated with input forms and application recorders. At the customer service representative layer, questions may be asked and representatives may actively listen for and submit issues 320—representing the transactional process of customer/representative open dialog. At the management layer, a next-level service recovery process 330 may be performed and compliance notification issues may be handled. Moreover, a process improvement, new product ideation, decision tree validation, and root-causes may be identified 340. An analytics layer 350 may act on a big data database (SQL Servers) to perform business intelligence development and/or big data processing. Finally, a leadership layer 360 may be associated with initiative acceptance and/or process improvement decisions.

Figure 4:
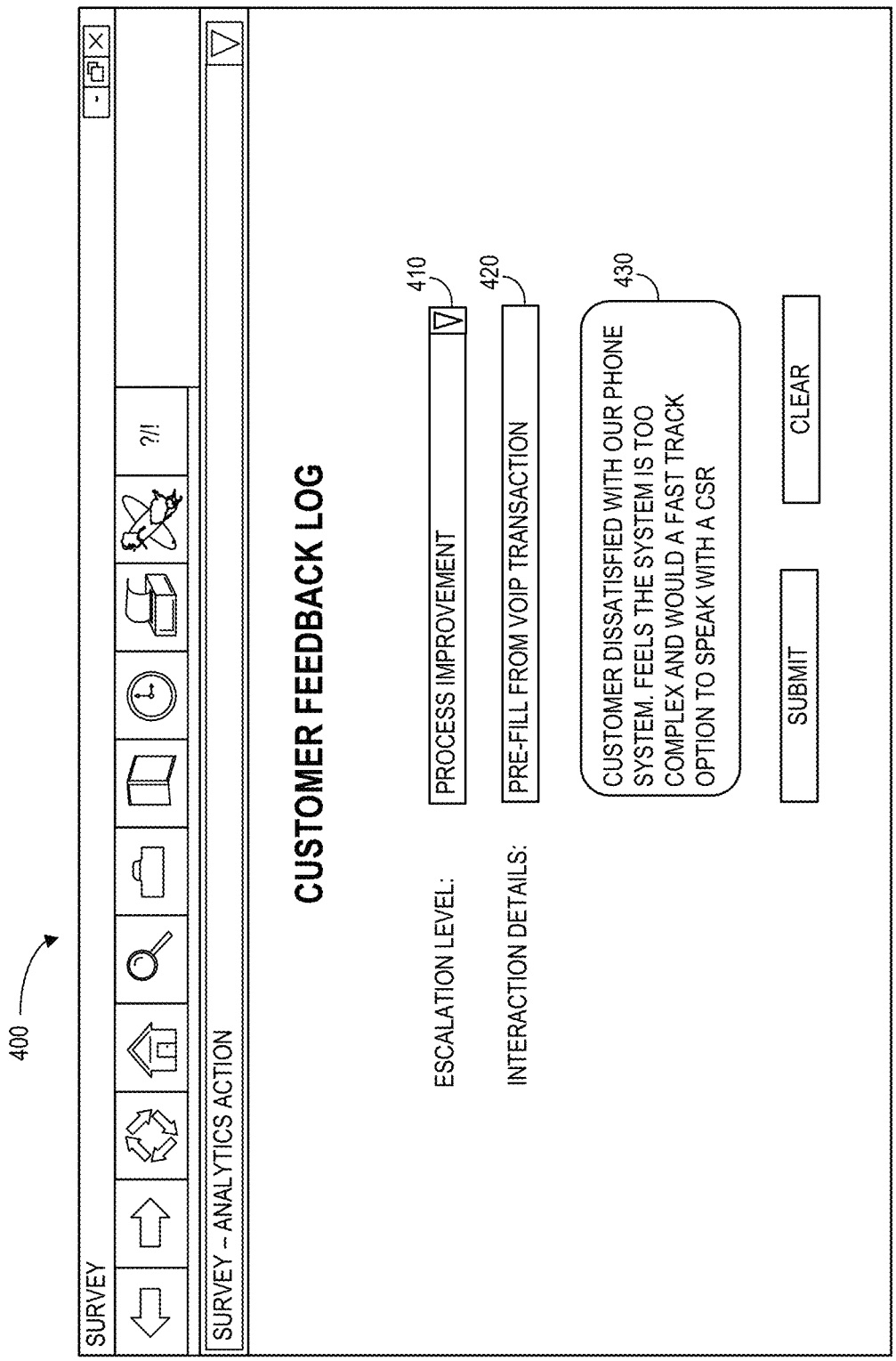
FIG. 4 is an example of an analytics action display according to some embodiments.

According to some embodiments, an analytics action may be automatically triggered and used to solicit feedback information from insurance customers. FIG. 4 is an example of an analytics action display 400 according to some embodiments. The display includes a user-selectable drop-down menu 410 that can be used to assign an escalation level classification for the customer interaction, such as "manager," "process improvement," "consumer affairs," "idea submission," etc. Interaction details 420 may be pre-populated based on VoIP transaction information, and a representative may be provided with a text field 430 where he or she can describe the interaction. Activating a submit icon may cause the web form to be multicast written to a SQL server database and a production database. Note that embodiments described herein may be associated with any appropriate type of database, including any Relational Database Management System ("RDMS") application and/or any third party database (e.g., to provide immediate call retrieval and/or listening abilities). The SQL server database might be used for internal logging, email notification, escalation level communications, and basic structured data reporting. Built into the form, may be a quick reference list of historic submissions (e.g., for the past 30 days) with submission status filtered by a network identifier so an individual can readily access recent submissions and determine whether or not a follow-up was initiated by their management team.

Figure 5:
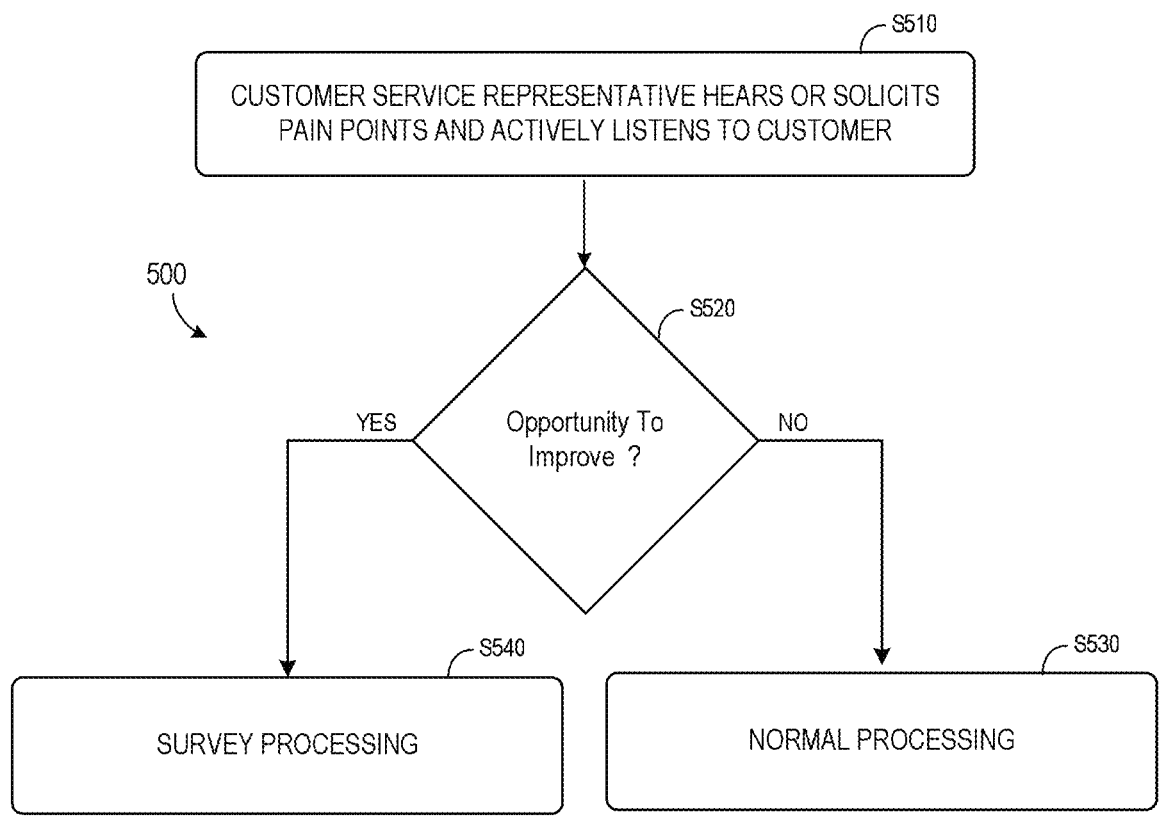
FIG. 5 illustrates a method in accordance with some embodiments.

FIG. 5 illustrates a method 500 that might be associated with probing and active listening at the customer service representative layer in accordance with some embodiments. At S510, the customer service representative may hear or solicit pain points from insurance customers and actively listen to their comments. If it is determined at S520 that the interaction not is associated with an opportunity to improve, normal processing continues at S530. If it is determined at S520 that the interaction is associated with an opportunity to improve, survey processing begins at S540. Note that within a dialog of a business transaction, the customer may offer unsolicited feedback to a customer service representative. Examples of unsolicited feedback may be about a specific process, corporate policy, underwriting practice, and/or the customer service representative's performance. At that point, the representative may have the ability to "Flag" the transaction, for management follow-up or a research group, while orally probing into the customer's issue(s). Using a simplified form, such as the one illustrated in FIG. 4, the customer service representative may flag the call and the dialogue may recorded and transcribed.

According to some embodiments, the customer service representative may: actively listen and respond to the customer (e.g., by stating "I understand you are having a problem today, and I want to help"); probe into the problem (e.g., with question like "What specifically was the problem? I want to be sure I properly document this today, did I hear you say . . . ." "How can we make the process better?," and "Could you give an example of a company that does it better?"); and/provide a confirmation that the enterprise will look into the issue (e.g., by stating "Please know that as we talked through your problem today, I have already submitted this to my management team and I assure that they will look into this for you.").

Figure 6:
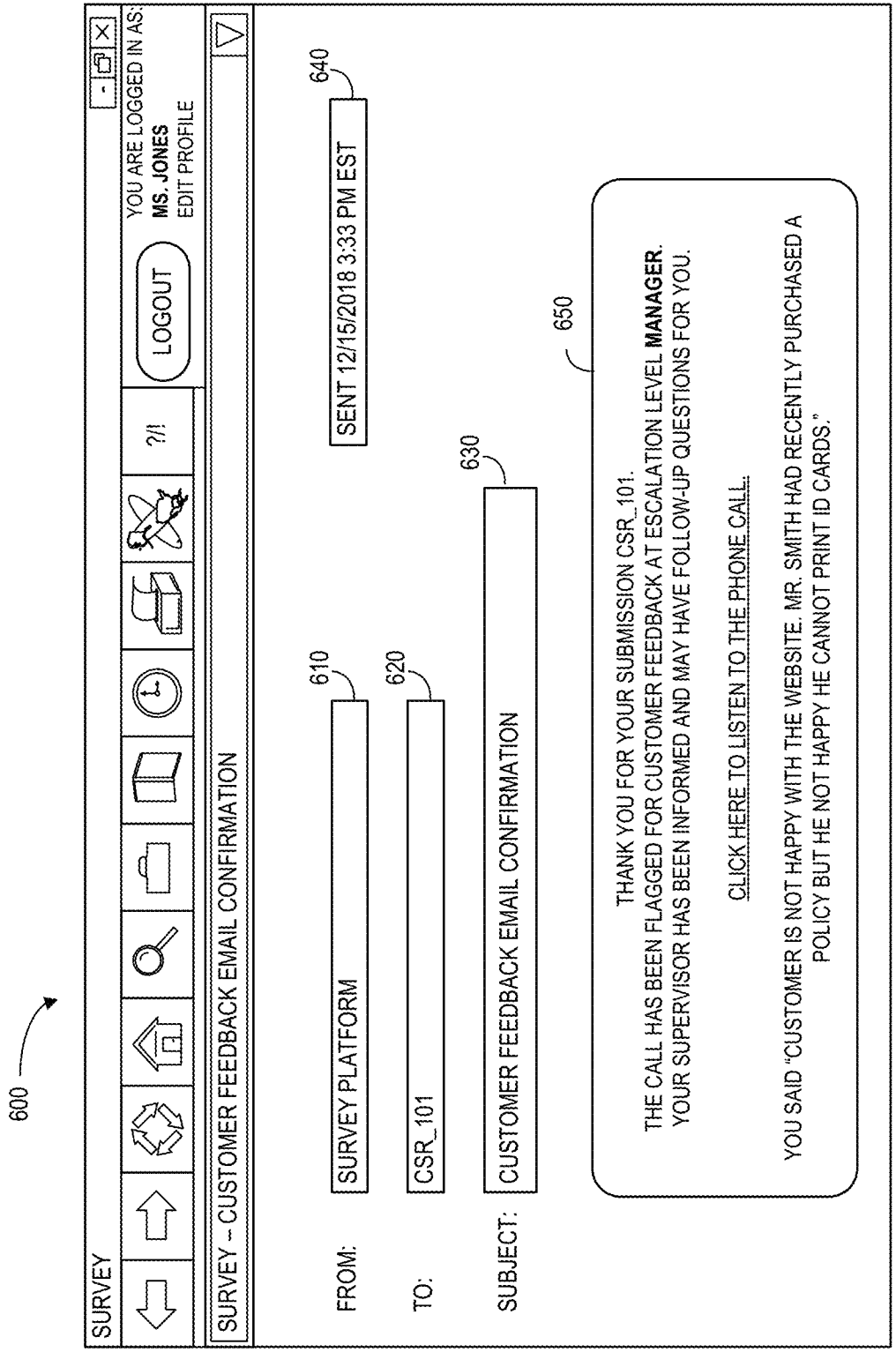
FIG. 6 is an example of a customer feedback email confirmation display according to some embodiments.

After the feedback is captured, management may initiate a service recovery layer. For example, a database server might automatically transmit a confirmation email to the customer service representative that the data has been captured. FIG. 6 is an example of a customer feedback email confirmation display 600 according to some embodiments. The display 600 include an indication of where the email was transmitted from 610, where the email was transmitted to 620, the subject of the email 630, and a time/date when the email was transmitted 640. A body 650 of the email may explain that the submission was received and a follow up process will be performed.

Figure 7:
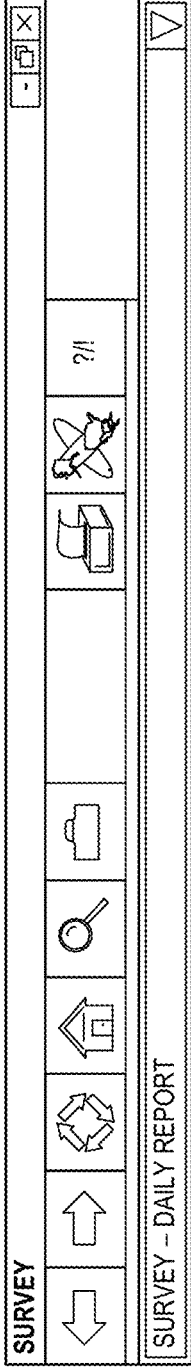
FIG. 7 is an example of a daily report display in accordance with some embodiments.

According to some embodiments, a survey platform may be further configured to automatically transmit a summary email to a manager associated with a plurality of customer service representatives. FIG. 7 is an example of a daily report display 700 in accordance with some embodiments. The display 700 include an indication of where the email was transmitted from 710, where the email was transmitted to 720, the subject of the email 730, and a time/date when the email was transmitted 740. A body 750 of the email may summarize which analytics actions have been submitted by which representatives (and indicate how many of those actions that are currently under investigation).

Figure 8:
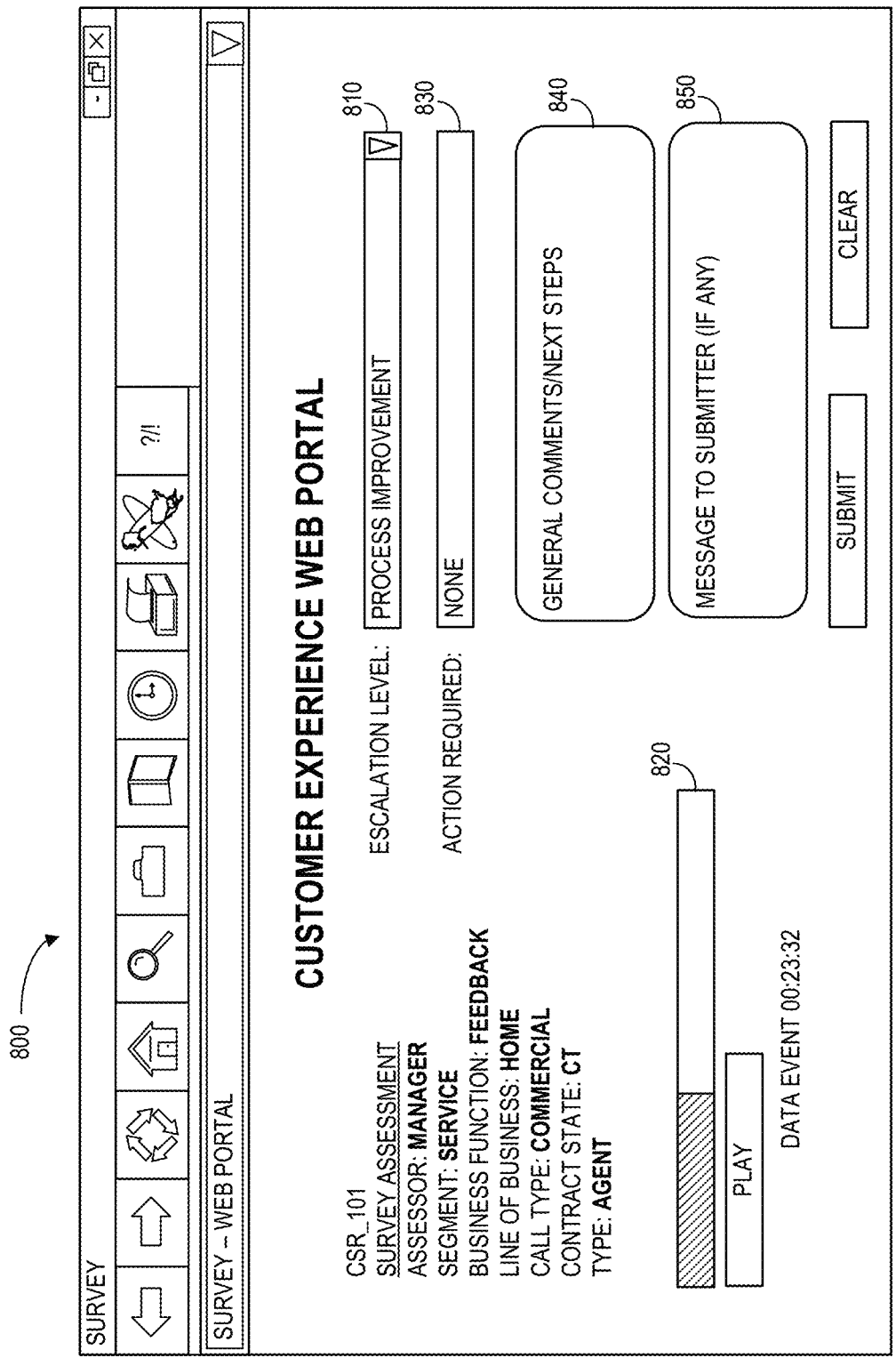
FIG. 8 is an example of a customer experience web portal display according to some embodiments.

During an investigation, a manager or management team may review the submitted analytics action. FIG. 8 is an example of a customer experience web portal display 800 according to some embodiments. The display 800 may indicate an assessor, segment, business function, line of business, call type, state, and/or type of analytics action submission along with an escalation level 810 that has been assigned. The manager may choose to play a portion of the customer interaction (e.g., the flagged portion of the telephone call) via an audio control portion 820 of the display 800. Any required action may be input 830 along with general comments/next steps 840 and a message to the original submitter 850 (if any). According to some embodiments, the manager may: review customer service representative notes (what did the representative capture as the problem? and does it merit attention?); listen to the call (via a URL and shared inbox for service recovery and the position where the submission was made may be flagged in the call); contact the customer (after determining if a re-contact is needed); and/or dispose of the issue (submit the issue to an escalation team for review, close the issue and follow-up with the representative, send the issue to an improvement program).

Figure 9:
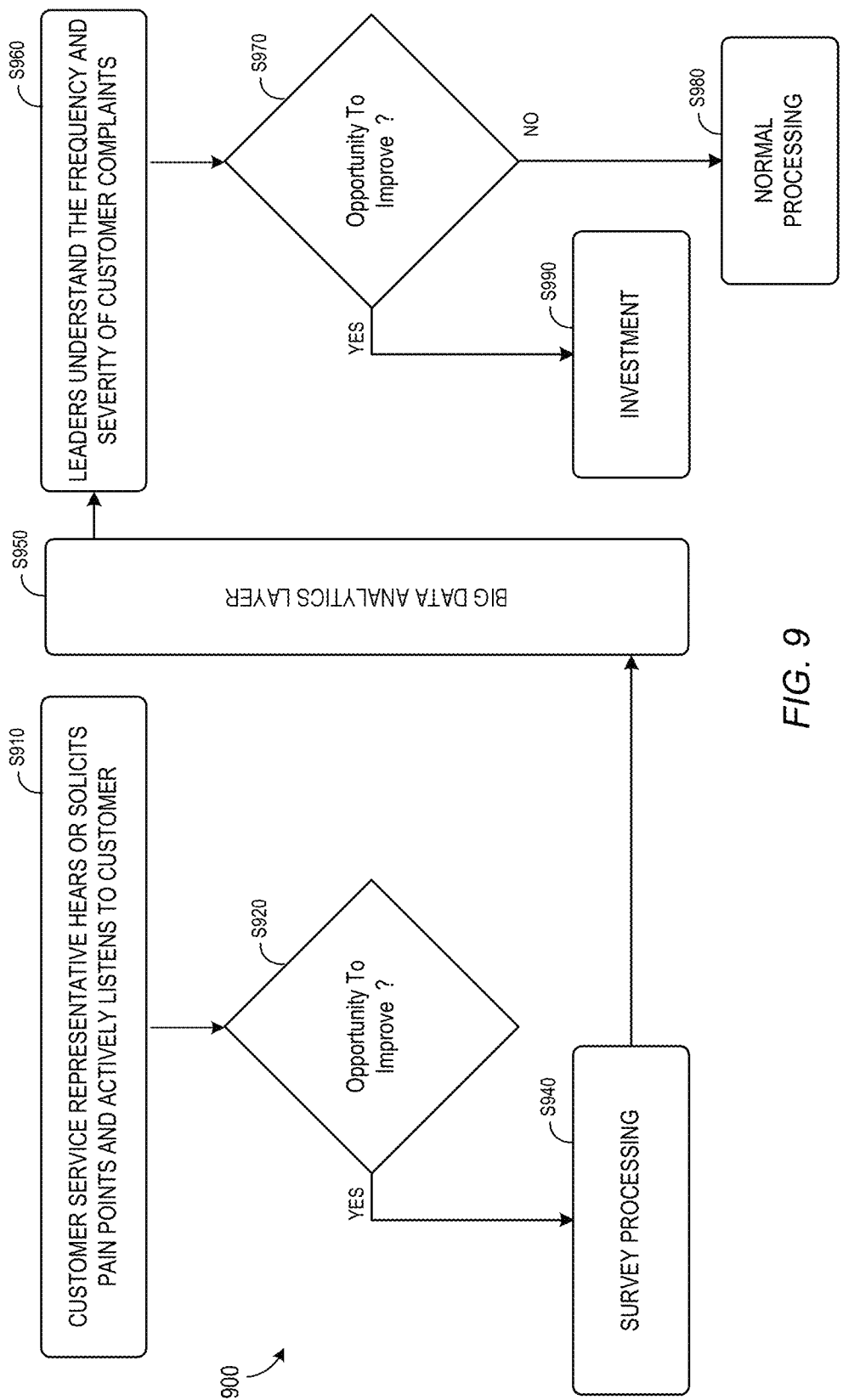
FIG. 9 illustrates a method in accordance with some embodiments.

FIG. 9 illustrates a method in accordance with some embodiments. At S910, the customer service representative may hear or solicit pain points from insurance customers and actively listen to their comments. If it is determined at S920 that the interaction is associated with an opportunity to improve, survey processing begins at S940. In particular, a big data analytics layer S950 may analyze the interaction and generate information such that enterprise leaders may understand the frequency and severity of customer complaints at S960. If there is no opportunity to improve at S970, normal processing continues at S980. If there may be an opportunity to improve at S970, an investment may be made at S990 (e.g., to improve the process after a CBA). Note that the analysis performed at S950 might be associated with a performance of text analytics, clustering and re-categorizing issues at a macros level, Pareto categories, and service recovery issues.

Figure 10:
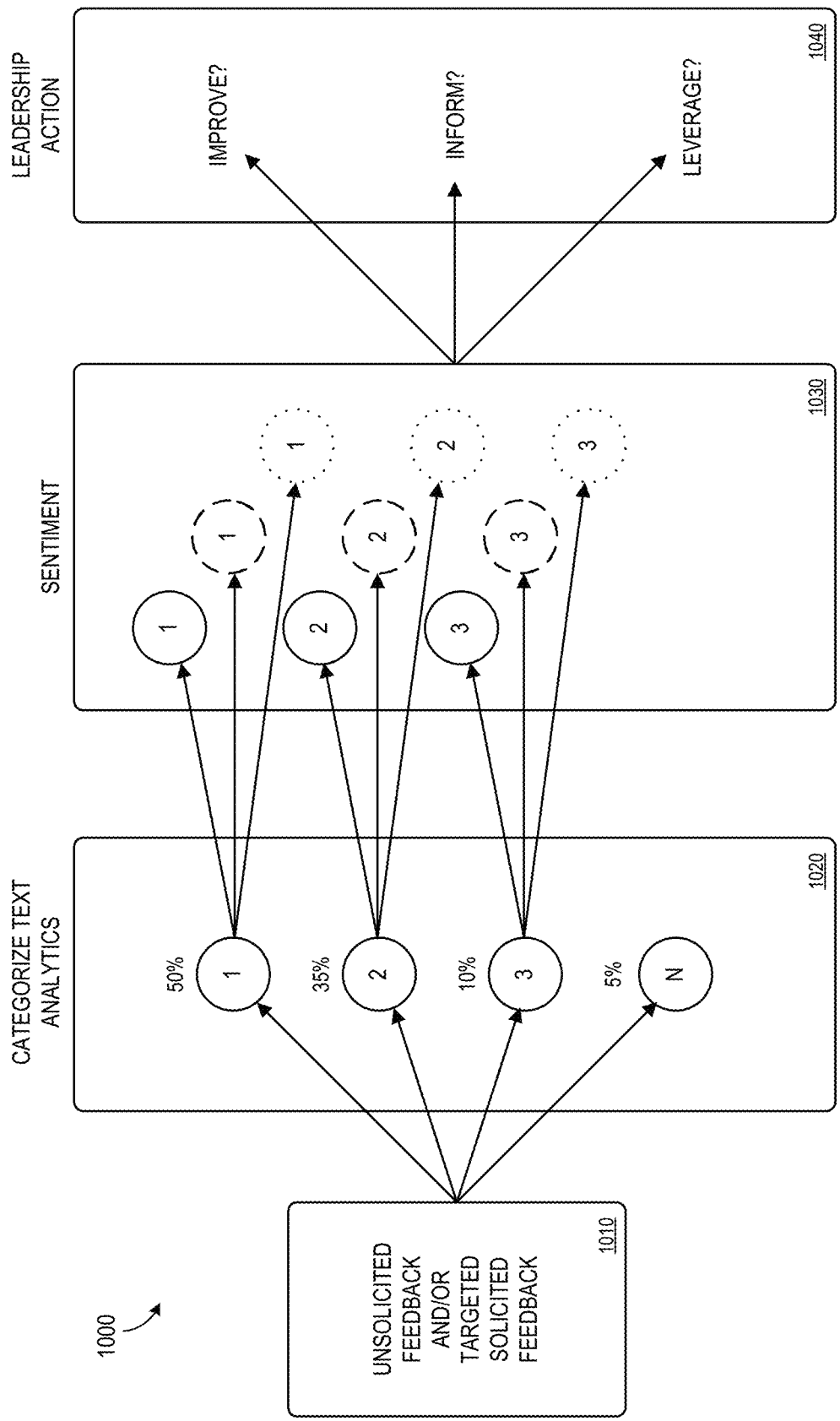
FIG. 10 is a block diagram of an analytics layer according to some embodiments.

According to some embodiments, an internal web form (analytics action) may be used to tag calls for unsolicited feedback and/or to prompt a representative to ask a probing question based on a leadership inquiry specific to a business initiative or process. A dialog box may be used to prompt the representative to solicit feedback from the customer, and call recording and speech analytics may be provided. The system may strip out only the survey question and feedback and process only this piece of text into a big data lake for text analytic processing. FIG. 10 is a block diagram of an analytics layer 1000 according to some embodiments. The analytics layer 1000 is composed of four basic parts, including raw unsolicited feedback and/or targeted solicited feedback 1010 (the moment of truth from the front line representative). A categorize text analytics part 1020 may be associated with a data analytics model for unsolicited feedback or with the question that was prompted for solicited feedback. In the case of unsolicited feedback, customer may express an opinion on a particular aspect of the enterprise, and the representative can tag the call for escalation, review, and management feedback. In the case of solicited feedback, the categories are input based on the question that is posed by the representative, established by a leadership team, for solicited feedback (or be implemented via data tagging). A sentiment portion 1030 may use a database model to bucket the sentiment into one of three groups: Positive (represented by a solid circle in FIG. 10), Negative (represented by a dotted circle in FIG. 10), and Neutral (represented by a dashed circle in FIG. 10). These groupings may be, for example, defined by tone and keywords used by the customer. A leadership action portion 1040 may decide to: "Improve" (e.g., once the issue is fully documented and understood, the leadership team may develop a CBA for the corrective action); "Inform" (e.g., insurance commissioner escalations, fraud concerns, potential improvement opportunities, etc.); or "Leverage" (e.g., understand what customers like about the current service and look to better market these opportunities, understand where customer service representative performance is praised by the customer and create a best practices catalogue, etc.).

Figure 11:
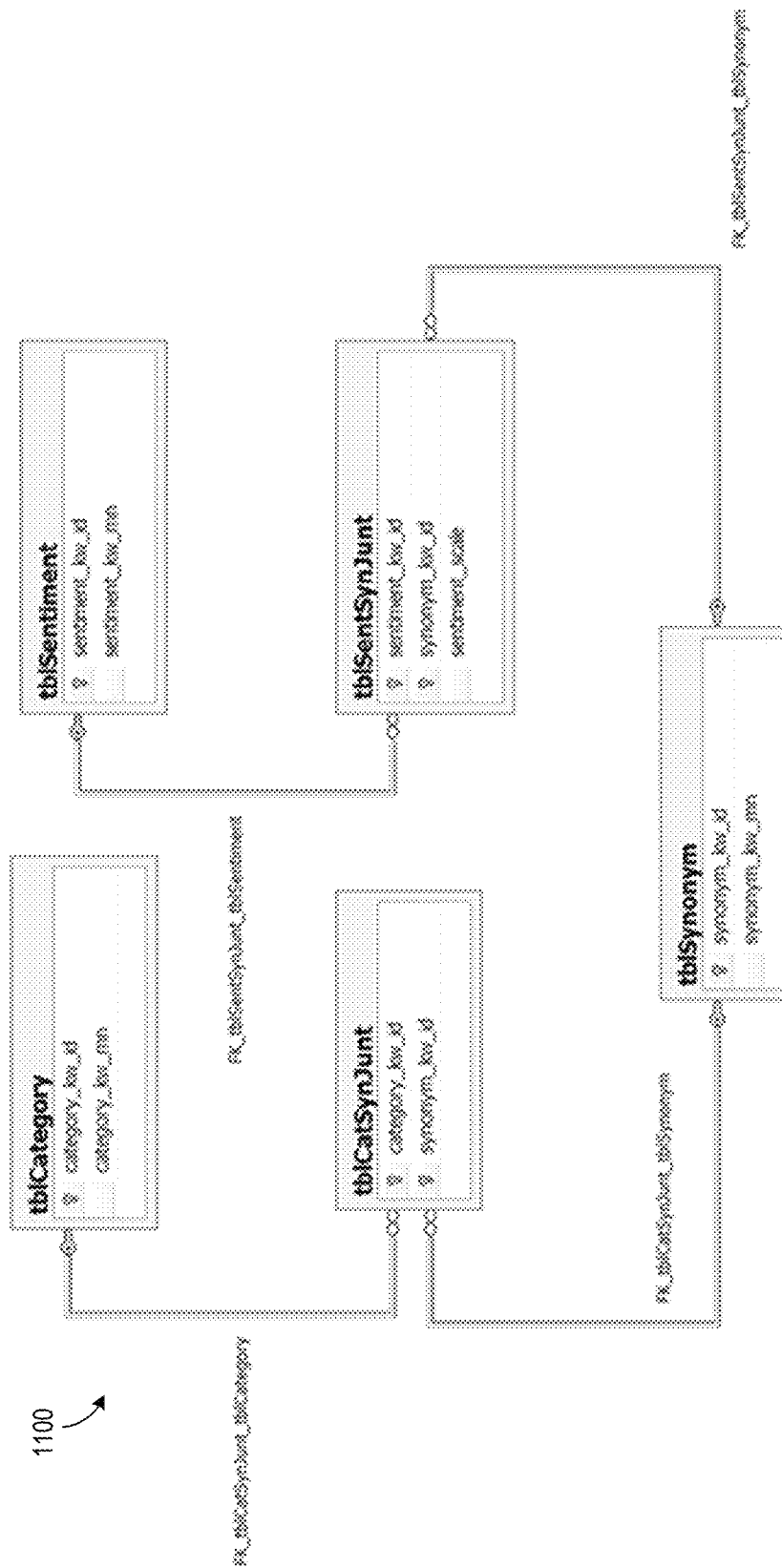
FIG. 11 is an example of a relational database layout in accordance with some embodiments.

Some embodiments are associated with a structured data architecture, such as a relational database that contains business rules enforced by constraints. FIG. 11 is an example of a relational database layout 1100 in accordance with some embodiments. In particular, categories, sentiments, synonyms, and keywords may be used to define relationships for the layout 1100.

Figure 12:
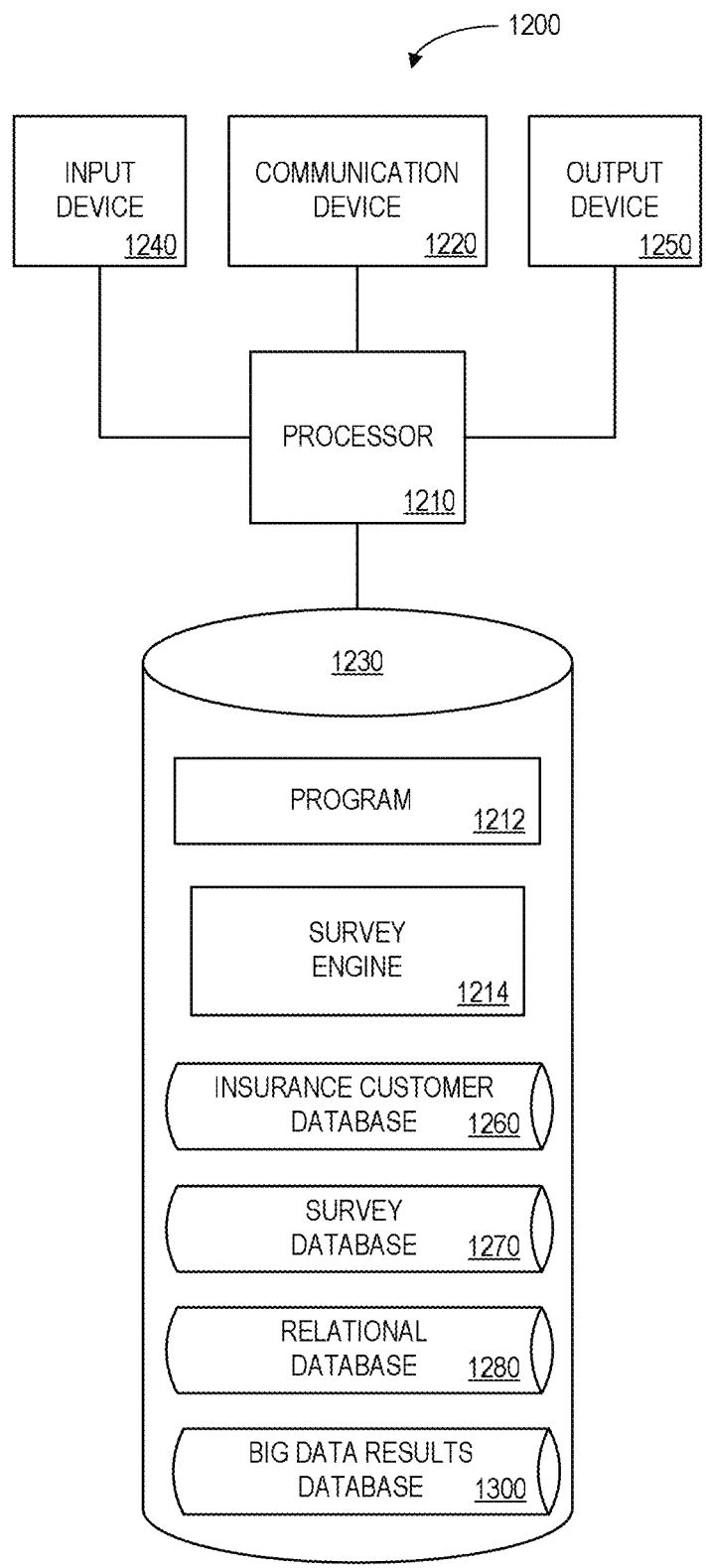
FIG. 12 is block diagram of a survey tool or platform according to some embodiments of the present invention.

The embodiments described herein may be implemented using any number of different hardware configurations. For example, FIG. 12 illustrates a survey platform 1200 that may be, for example, associated with the system 100 of FIG. 1. The survey platform 1200 comprises a processor 1210, such as one or more commercially available Central Processing Units (CPUs) in the form of one-chip microprocessors, coupled to a communication device 1220 configured to communicate via a communication network (not shown in FIG. 12). The communication device 1220 may be used to communicate, for example, with one or more remote customer service representative devices. Note that communications exchanged via the communication device 1220 may utilize security features, such as those between a public internet user and an internal network of the insurance enterprise. The security features might be associated with, for example, web servers, firewalls, and/or PCI infrastructure. The survey platform 1200 further includes an input device 1240 (e.g., a mouse and/or keyboard to enter information about follow-up actions) and an output device 1250 (e.g., to output leadership reports regarding system administration and/or opportunities).

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or a survey engine or application 1214 for controlling the processor 1210. The processor 1210 performs instructions of the programs 1212, 1214, and thereby operates in accordance with any of the embodiments described herein. For example, the processor 1210 may store, for each of a plurality of customers of an enterprise, historic customer satisfaction information in a customer database system. The processor 1210 may also facilitate an interaction between a customer service representative and a first customer. When the processor 1210 detects that the customer service representative terminal is currently interacting with the first customer and that the first customer is associated with an entry in the customer database system, the processor 1210 may automatically trigger an analytics action at the customer service representative terminal. A relational database may receive solicited customer feedback information from the customer service representative terminal, along with a structured escalation level category entered via the analytics action. The solicited customer feedback information may be parsed into unstructured text (e.g., by a speech-to-text application). Moreover, the processor 1210 may execute an algorithm to assign a sub-category to the first customer interaction based on the unstructured parsed text. An indication of the solicited customer feedback may then be recorded into one of a positive sentiment pool, a neutral sentiment pool, and a negative sentiment pool.

The programs 1212, 1214 may be stored in a compressed, uncompiled and/or encrypted format. The programs 1212, 1214 may furthermore include other program elements, such as an operating system, a database management system, and/or device drivers used by the processor 1210 to interface with peripheral devices.

As used herein, information may be "received" by or "transmitted" to, for example: (i) the survey platform 1200 from another device; or (ii) a software application or module within the survey platform 1200 from another software application, module, or any other source.

In some embodiments (such as shown in FIG. 12), the storage device 1230 includes an insurance customer database 1260, a survey database 1270, a relational database 1280, and a big data results database 1300. An example of a database that may be used in connection with the survey platform 1200 will now be described in detail with respect to FIG. 13. Note that the databases described herein are only examples, and additional and/or different information may be stored therein. Moreover, various databases might be split or combined in accordance with any of the embodiments described herein. For example, the survey database 1270 and relational database 1280 might be combined and/or linked to each other within the survey engine 1214.

Referring to FIG. 13, a table is shown that represents the big data results database 1300 that may be stored at the survey platform 1200 according to some embodiments. The table may include, for example, entries identifying interactions that have been analyzed by the system. The table may also define fields 1302, 1304, 1306, 1308, 1310 for each of the entries. The fields 1302, 1304, 1306, 1308, 1310 may, according to some embodiments, specify: a customer service representative identifier 1302, an insurance policy identifier 1304, a survey identifier 1306, category and sub-category 1308, and sentiment information 1310. The big data results database 1300 may be created and updated, for example, based on information electrically received from a customer service representative device (e.g., via an automatically triggered analytics action).

The customer service representative identifier 1302 may be, for example, a unique alphanumeric code identifying a representative who interacted with an insurance customer. The insurance policy identifier 1304 may be associated with the customer's insurance policy, and survey identifier 1306 may uniquely identify the interaction. The category and subcategory 1308 may represent, for example, an escalation level and an automatically assigned sub-category for the interaction. The sentiment information 1310 may represent the assignment of the interaction to one of: a positive pool, a neutral pool, and a negative pool.

Thus, embodiments may use historic data as a method to directly question an insurance customer ("solicited feedback"). As an example of solicited feedback, consider a customer who previously rated an insurance enterprise poorly from "net promoter score" perspective. As used herein, the phrase "net promoter score" may refer to a fundamental perspective that insurance enterprise customers can be divided into three categories: Promoters, Passives, and Detractors. A customer might be asked "How likely is it that you would recommend the insurance enterprise to a friend or colleague?" These groups may be tracked to get a clear measure of enterprise performance through customers' eyes. In some embodiments, customers may respond on a 0 through 10 point rating scale and are categorized as follows:

Promoters (score 9 through 10) are loyal enthusiasts who will keep buying and refer others, fueling growth;

Passives (score 7 through 8) are satisfied but unenthusiastic customers who are vulnerable to competitive offerings; and Detractors (score 0 through 6) are unhappy customers who can damage a brand and impede growth through negative word-of-mouth.

To calculate a net promotor score, the percentage of customers who are Detractors may be subtracted from the percentage who are Promotors. Note that this method of ranking customers is provided only as one example, and embodiments may be implemented utilizing any other type of rating procedure.

Returning to the example, a customer currently interacting with the representative had previously given a relatively low score in the rating scale. As a result, an analytics action is used to prompt the customer service representative to ask a question directly to the customer and listen to the customer's response. From there, the system may report reasons, in aggregate, without listening to individual calls. Some embodiments may automate the listening part of process. Moreover, there may also be an option to tag direct unsolicited feedback from the customer. An example of this may be a customer calls in to complain that a website did not send an insurance identification card when it should have. The enterprise could log this as a research opportunity and track it using the survey platform for global reporting. Such a system may provide a method to track and evaluate these issues, in a "Just In Time" ("JIT"), automated fashion.

For both solicited feedback and unsolicited feedback, embodiments may use a trigger set by an analytics action (not by a speech category). A "button" press may trigger the application to save that piece of the telephone call as a text transcription. From there, the survey platform may load data into a machine learning environment that uses both relational database processing and big data processing. For the relational database, the system may create an upfront category using the structured data category from the form dropdown, called "Escalation Level." Some embodiments may then use a big data application, Hadoop, to sub-categorize the interaction using an algorithm to analyze only a piece of the conversation that had been sent to the big data lake. Note that there might be no limits for this sub-categorization—examples could include rate increase, phone system problem, website issue . . . N. From there, the system may then bucket interactions into caller Sentiment: Negative, Neutral, and Positive. This sentiment may be used to inform enterprise leadership about customer value judgments and the service being provided by the enterprise.

Figure 14:
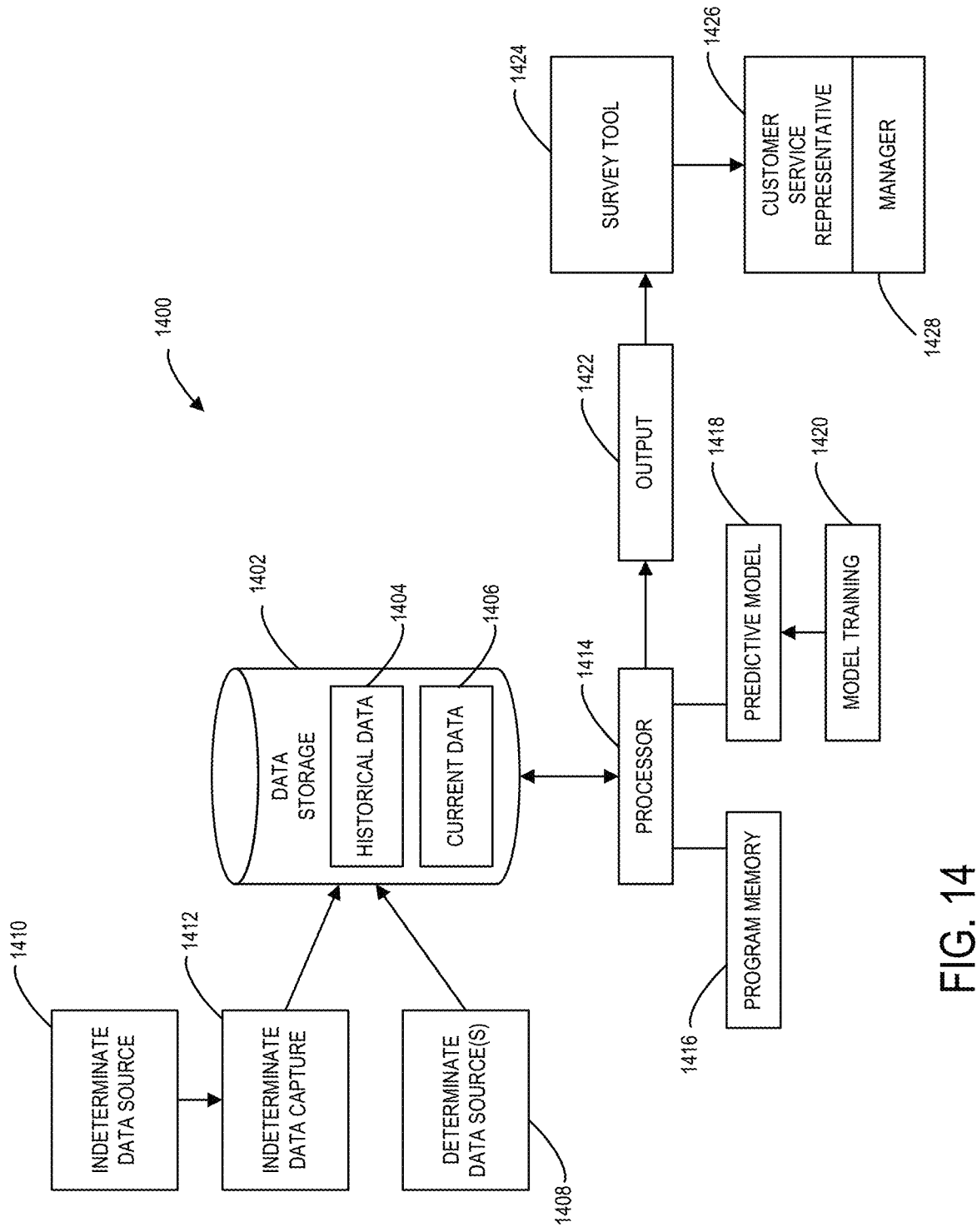
FIG. 14 illustrates a system associated with a predictive model according to some embodiments

According to some embodiments, one or more predictive models may be used to analyze customer feedback information. Features of some embodiments associated with a predictive model will now be described by first referring to FIG. 14. FIG. 14 is a partially functional block diagram that illustrates aspects of a computer system 1400 provided in accordance with some embodiments of the invention. For present purposes it will be assumed that the computer system 1400 is operated by an insurance company (not separately shown) for the purpose of supporting analysis of customer feedback information.

The computer system 1400 includes a data storage module 1402. In terms of its hardware the data storage module 1402 may be conventional, and may be composed, for example, by one or more magnetic hard disk drives. A function performed by the data storage module 1402 in the computer system 1400 is to receive, store and provide access to both historical transaction data (reference numeral 1404) and current transaction data (reference numeral 1406). As described in more detail below, the historical transaction data 1404 is employed to train a predictive model to provide an output that indicates history data, and the current transaction data 1406 is thereafter analyzed by the predictive model. Moreover, as time goes by, and results become known from processing current transactions, at least some of the current transactions may be used to perform further training of the predictive model. Consequently, the predictive model may thereby adapt itself to changing environments.

Either the historical transaction data 1404 or the current transaction data 1406 might include, according to some embodiments, determinate and indeterminate data. As used herein and in the appended claims, "determinate data" refers to verifiable facts such as the an age of a home; a home type; an event type (e.g., fire or flood); a date of loss, or date of report of claim, or policy date or other date; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files. Indeterminate data extracted from medical notes or accident reports might be associated with, for example, an amount of loss and/or details about damages.

The determinate data may come from one or more determinate data sources 1408 that are included in the computer system 1400 and are coupled to the data storage module 1402. The determinate data may include "hard" data like a customer's name, date of birth, social security number, policy number, address; the date of loss; the date the claim was reported, etc. One possible source of the determinate data may be the insurance company's policy database (not separately indicated). Another possible source of determinate data may be from data entry by the insurance company's claims intake administrative personnel.

The indeterminate data may originate from one or more indeterminate data sources 1410, and may be extracted from raw files or the like by one or more indeterminate data capture modules 1412. Both the indeterminate data source(s) 1410 and the indeterminate data capture module(s) 1412 may be included in the computer system 1400 and coupled directly or indirectly to the data storage module 1402. Examples of the indeterminate data source(s) 1410 may include data storage facilities for document images, for text files (e.g., claim handlers' notes) and digitized recorded voice files (e.g., claimants' oral statements, witness interviews, claim handlers' oral notes, etc.). Examples of the indeterminate data capture module(s) 1412 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, customer service representative opinions may be extracted from their narrative text file notes.

The computer system 1400 also may include a computer processor 1414. The computer processor 1414 may include one or more conventional microprocessors and may operate to execute programmed instructions to provide functionality as described herein. Among other functions, the computer processor 1414 may store and retrieve historical claim transaction data 1404 and current claim transaction data 1406 in and from the data storage module 1402. Thus the computer processor 1414 may be coupled to the data storage module 1402.

The computer system 1400 may further include a program memory 1416 that is coupled to the computer processor 1414. The program memory 1416 may include one or more fixed storage devices, such as one or more hard disk drives, and one or more volatile storage devices, such as RAM devices. The program memory 1416 may be at least partially integrated with the data storage module 1402. The program memory 1416 may store one or more application programs, an operating system, device drivers, etc., all of which may contain program instruction steps for execution by the computer processor 1414.

The computer system 1400 further includes a predictive model component 1418. In certain practical embodiments of the computer system 1400, the predictive model component 1418 may effectively be implemented via the computer processor 1414, one or more application programs stored in the program memory 1416, and data stored as a result of training operations based on the historical transaction data 1404 (and possibly also data received from a third party service). In some embodiments, data arising from model training may be stored in the data storage module 1402, or in a separate data store (not separately shown). A function of the predictive model component 1418 may be to determine appropriate analyze customer feedback information, results, and/or scores. The predictive model component may be directly or indirectly coupled to the data storage module 1402.

The predictive model component 1418 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 1400 includes a model training component 1420. The model training component 1420 may be coupled to the computer processor 1414 (directly or indirectly) and may have the function of training the predictive model component 1418 based on the historical claim transaction data 1404 and/or information about weather and other types of events. (As will be understood from previous discussion, the model training component 1420 may further train the predictive model component 1418 as further relevant data becomes available.) The model training component 1420 may be embodied at least in part by the computer processor 1414 and one or more application programs stored in the program memory 1416. Thus the training of the predictive model component 1418 by the model training component 1420 may occur in accordance with program instructions stored in the program memory 1416 and executed by the computer processor 1414.

In addition, the computer system 1400 may include an output device 1422. The output device 1422 may be coupled to the computer processor 1414. A function of the output device 1422 may be to provide an output that is indicative of (as determined by the trained predictive model component 1418) particular simulation results, scores, and upsell recommendations. The output may be generated by the computer processor 1414 in accordance with program instructions stored in the program memory 1416 and executed by the computer processor 1414. More specifically, the output may be generated by the computer processor 1414 in response to applying the data for the customer feedback information to the trained predictive model component 1418. The output may, for example, be an estimate and/or likelihood within a predetermined range of numbers. In some embodiments, the output device may be implemented by a suitable program or program module executed by the computer processor 1414 in response to operation of the predictive model component 1418.

Still further, the computer system 1400 may include a survey tool module 1424. The survey tool module 1424 may be implemented in some embodiments by a software module executed by the computer processor 1414. The survey tool module 1424 may have the function of rendering a portion of the display on the output device 1422. Thus the survey tool module 1424 may be coupled, at least functionally, to the output device 1422. In some embodiments, for example, the survey tool module 1424 may direct workflow by referring, to a customer service representative platform 1426, current simulation results generated by the predictive model component 1418 and found to be associated with various results or scores. In some embodiments, these current simulations may be provided to a manager 1428 who may monitor and review representatives as appropriate.

Thus, embodiments may provide an automated and efficient way to facilitate an analysis of customer feedback information. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 15:
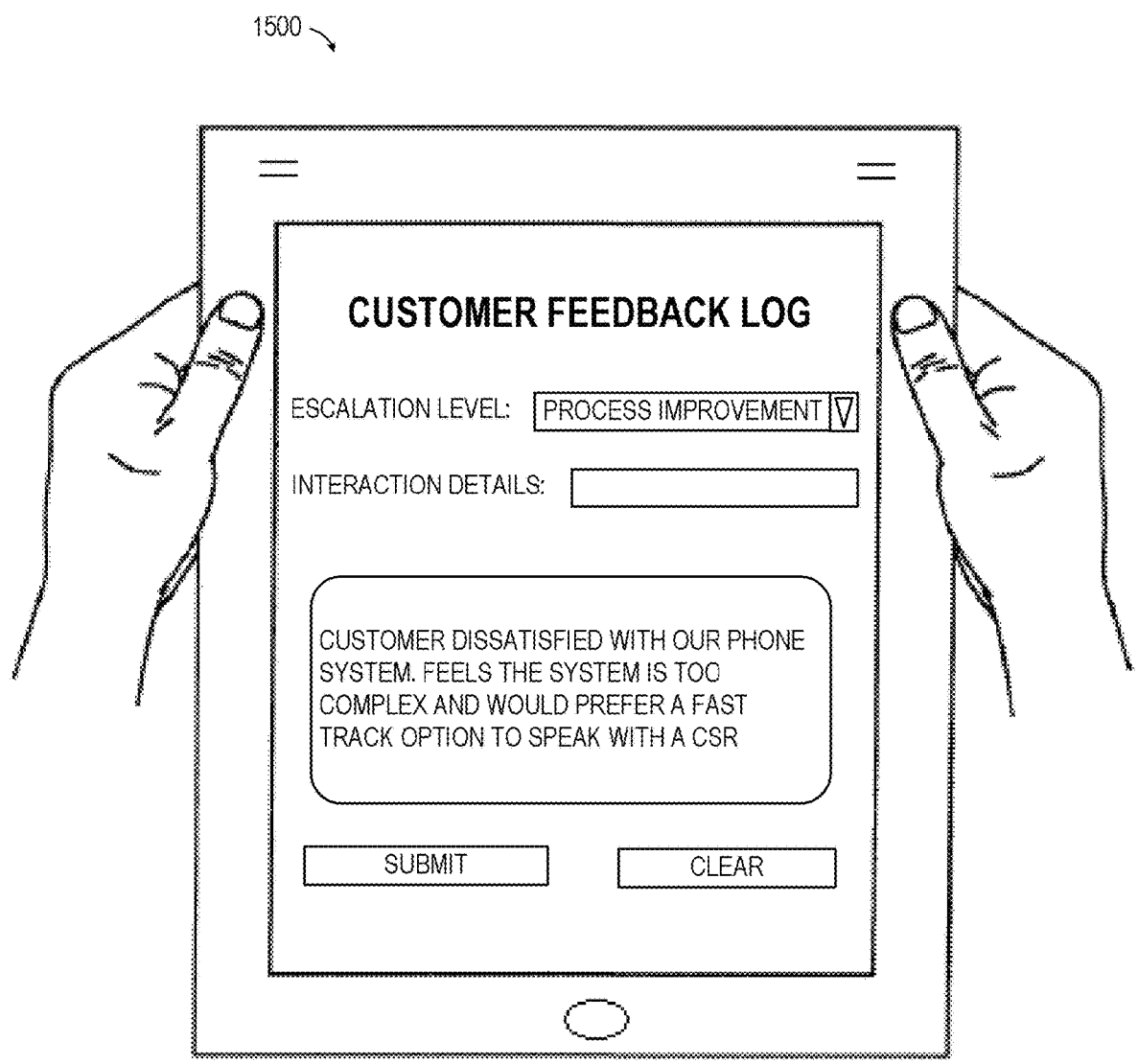
FIG. 15 illustrates a survey display on a portable device in accordance with some embodiments.

Although specific hardware and data configurations have been described herein, note that any number of other configurations may be provided in accordance with embodiments of the present invention (e.g., some of the information associated with big data results might be implemented as an augmented reality display and/or the databases described herein may be combined or stored in external systems). Moreover, although embodiments have been described with respect to an individual customer, embodiments may instead be associated with a business (in which case, the big data results may refer to a commercial location). In addition, some or all of the information described herein might be shared (e.g., manually or automatically) via a social media platform, such as by posting a result to a social media account. Still further, the displays and devices illustrated herein are only provided as examples, and embodiments may be associated with any other types of user interfaces. For example, FIG. 15 illustrates a handheld analytics action survey display 1500 according to some embodiments.

Figure 16:
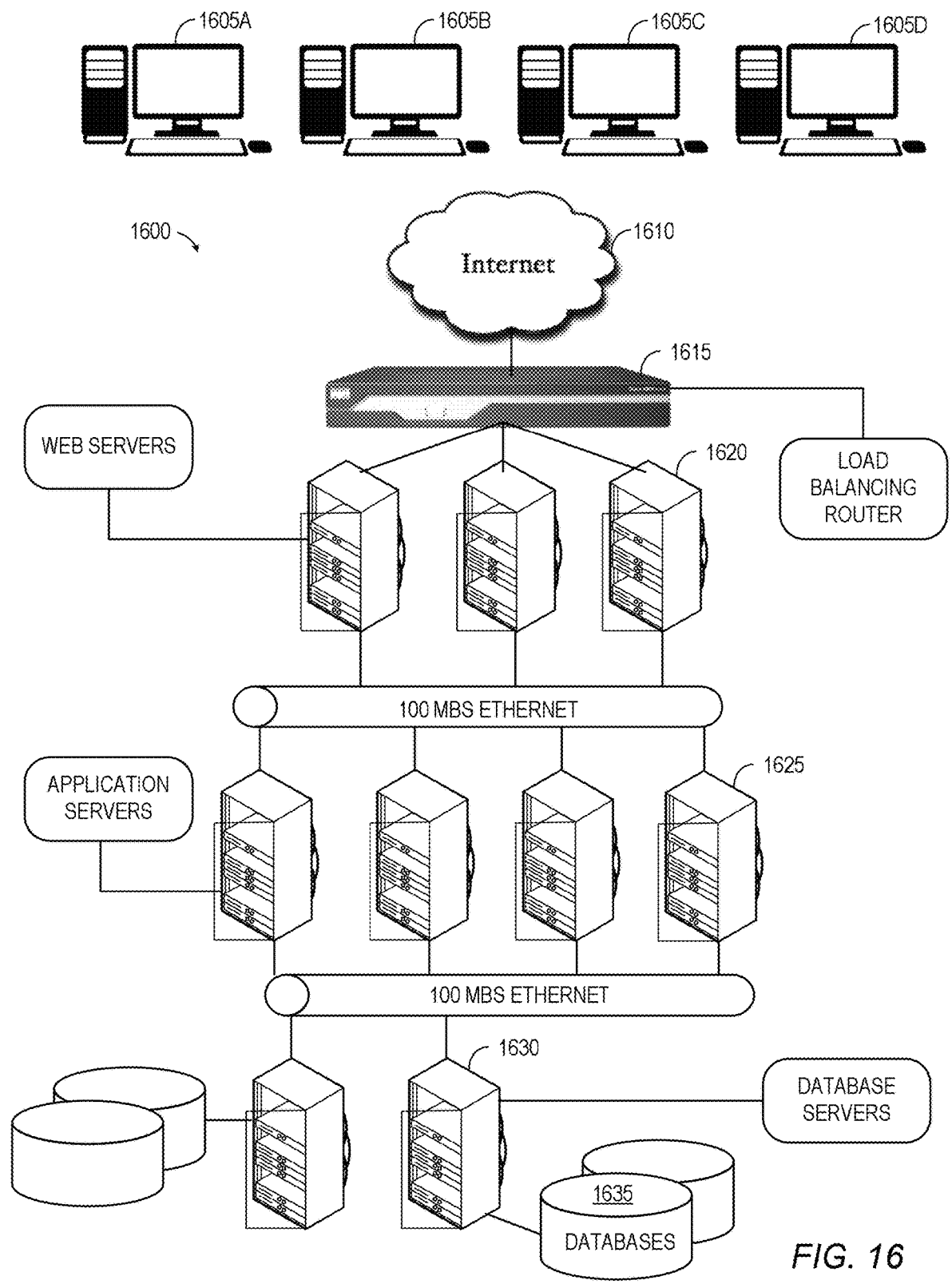
FIG. 16 is an example of a system architecture according to some embodiments.

Note that the hardware configurations illustrated herein are provided only as examples and embodiments may be implemented using any suitable hardware arrangement. For example, FIG. 16 is an example of a system architecture 1600 in accordance with some embodiments. In this embodiment, the duties of a processor may be split among several computer systems 1620, 1625, 1630. A data store may be implemented through a database system 1630. The Internet 1610 may serve as a communication link to visitor computers 1605A through 1605D. In this embodiment, the system utilizes multiple, relatively inexpensive computer systems at every level of the architecture. Routing between levels may automatically distribute the load amongst the functioning computers. Increasing throughput becomes a matter of adding more computers, not scaling up the existing ones. This arrangement may also provide fault tolerance since the failure of one server will not incapacitate the system as long as another server providing the same service is alive. This approach may also permit the distribution of servers geographically. A router 1615 may also provide further load balancing.

The tasks performed by the processors may utilize a variety of underlying software technology. In one embodiment, the software architecture can be divided into 3 tiers: web server, application-server and database-server. Each tier may be comprised of a number of software layers.

The web server tier may tier may access application functionality by calling an Application Programming Interface ("API"). The API might, for example, take a Document Object Model ("DOM") object as a parameter and return a DOM object as a response. The request may be relayed to the application server tier where a dispatching method may unpack the request object, inspect it, invoke the desired method, and send back the response object. This approach means that new functionality may become available as soon as the application server is upgraded. It is not necessary to develop a set of "stubs" that mirror the new API call. As a result, new functionality in the application tier can be utilized immediately simply by modifying an Active Server Page ("ASP") script—no web server resident Dynamic Link Libraries ("DLLs") may need to be upgraded so the server does not need to be shut down. The web server tier will typically run on server computers 1620 having a multitasking operating system such as Windows® from Microsoft or other suitable operating system software. The web server tier might contain, for example, web server software, ASP scripts, COM adapters, an API client layer, a cache, and/or a remote procedure call client.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system to analyze feedback data, the system comprising:
    a customer database system to store, for each of a plurality of customers of an enterprise, historic customer satisfaction information associated with past customer interactions, wherein the information in the customer database system further includes information associated with a net promoter score calculated as follows: (i) determine a number of customers P who are likely to promote the enterprise, (ii) determine a number of customers D who are likely to actively discourage others from using the enterprise, and (iii) set the net promotor score to P minus D;
    a customer service representative terminal to facilitate a current interaction between a customer service representative and a first customer;
    a survey platform, coupled to the insurance customer database system and the customer service representative terminal, including:
        a first computer processor, and
        a first computer memory, coupled to the first computer processor, storing instructions that, when executed by the first computer processor, cause the survey platform to:

(i) detect that the customer service representative terminal is currently interacting with the first customer and that the first customer is associated with an entry in the customer database system regarding a past interaction with the first customer, and (ii) responsive to the detection and a net promotor score value associated with the first customer, automatically trigger an analytics action at the customer service representative terminal during the current interaction, wherein the automatically triggered analytics action includes a drop-down selection of potential escalation levels and an associated interaction details field that is automatically pre-populated by the first processor based on Voice Over Internet Protocol transaction information;

a relational database to receive solicited customer feedback information from the customer service representative terminal during the current interaction, along with a structured escalation level category entered via the analytics action, wherein the solicited customer feedback information is automatically parsed into unstructured text;

a predictive model platform to receive and analyze the unstructured text and thereby generate a customer feedback prediction; and a big data application platform coupled to the relational database, including:
a second computer processor, and
a second computer memory, coupled to the second computer processor, storing instructions that, when executed by the second computer processor, cause the big data application platform to:
(i) automatically execute an algorithm to assign a sub-category to the first customer interaction based on the unstructured parsed text and customer feedback prediction,
(ii) record an indication of the solicited customer feedback into one of a positive sentiment pool, a neutral sentiment pool, and a negative sentiment pool, and
(iii) automatically direct a workflow associated with a customer feedback response during the current interaction.

2. The system of claim 1, wherein the interaction between the customer service representative and the first customer comprises one of: (i) a telephone call, and (ii) a customer chat interface.

3. The system of claim 1, wherein the automatically triggered analytics action further includes customer feedback text entered by the customer service representative.

4. The system of claim 1, wherein the relational database may further receive unsolicited customer feedback information.

5. The system of claim 1, wherein the survey platform is further configured to automatically transmit a confirmation email to the customer service representative.

6. The system of claim 1, wherein the survey platform is further configured to automatically transmit a summary email to a manager associated with a plurality of customer service representatives.

7. The system of claim 1, wherein the big data application platform is associated with a Relational Database Management System server.

8. The system of claim 1, wherein information about the positive sentiment pool, the neutral sentiment pool, and the negative sentiment pool are summarized and included in an automatically generated leadership report.

9. A computerized method to analyze feedback data, comprising:
storing, for each of a plurality of customers of an enterprise, historic customer satisfaction information in a customer database system associated with past customer interactions, wherein the information in the customer database system further includes information associated with a net promoter score calculated as follows: (i) determine a number of customers P who are likely to promote the enterprise, (ii) determine a number of customers D who are likely to actively discourage others from using the enterprise, and (iii) set the net promotor score to P minus D;

facilitating, by a customer service representative terminal, a current interaction between a customer service representative and a first customer;

detecting, by a first computer processor of a survey platform coupled to the customer database system and the customer service representative terminal, that the customer service representative terminal is currently interacting with the first customer and that the first customer is associated with an entry in the customer database system regarding a past interaction with the first customer;

responsive to the detection and a net promotor score value associated with the first customer, automatically triggering an analytics action at the customer service representative terminal during the current interaction, wherein the automatically triggered analytics action includes a drop-down selection of potential escalation levels and an associated interaction details field that is automatically pre-populated by the first processor based on Voice Over Internet Protocol transaction information;

receiving, by a relational database, solicited customer feedback information from the customer service representative terminal during the current interaction, along with a structured escalation level category entered via the analytics action;

automatically parsing the solicited customer feedback audio information into unstructured text;

receiving an analyzing, by a predictive model platform, the unstructured text and thereby generate a customer feedback prediction;

executing, by a second computer processor of a big data application platform coupled to the relational database, an algorithm to assign a sub-category to the first customer interaction based on the unstructured parsed text and customer feedback prediction;

recording, by the big data platform, an indication of the solicited customer feedback into one of a positive sentiment pool, a neutral sentiment pool, and a negative sentiment pool; and automatically directing, by the big data application platform, a workflow associated with a customer feedback response during the current interaction.

10. The method of claim 9, wherein the interaction between the customer service representative and the first customer comprises one of: (i) a telephone call, or (ii) a customer chat interface.

11. The method of claim 9, wherein the automatically triggered analytics action further includes customer feedback text entered by the customer service representative and the relational database may further receive unsolicited customer feedback information.

12. The method of claim 9, wherein the survey platform is further configured to automatically transmit: (i) a confirmation email to the customer service representative, and (ii) a summary email to a manager associated with a plurality of customer service representatives.

13. The method of claim 9, wherein the big data application platform is associated with a Relational Database Management System server.

14. A computer system to analyze feedback data, the system comprising:
   an insurance customer database system to store, for each of a plurality of insurance customers of the insurance enterprise, historic customer satisfaction information associated with past customer interactions, wherein the information in the insurance customer database system further includes information associated with a net promoter score calculated as follows: (i) determine a number of customers P who are likely to promote the insurance enterprise, (ii) determine a number of customers D who are likely to actively discourage others from using the insurance enterprise, and (iii) set the net promotor score to P minus D;
   a customer service representative terminal to facilitate a current telephone call between a customer service representative and a first customer;
   a survey platform, coupled to the insurance customer database system and the customer service representative terminal, including:
      a first computer processor, and
      a first computer memory, coupled to the first computer processor, storing instructions that, when executed by the first computer processor, cause the survey platform to:
         (i) detect that the customer service representative terminal is currently having a telephone call with the first customer and that the first customer is associated with an entry in the insurance customer database system regarding a past interaction with the first customer, and
         (ii) responsive to the detection and a net promotor score value associated with the first customer, automatically trigger an analytics action at the customer service representative terminal during the current interaction, wherein the automatically triggered analytics action includes a drop-down selection of potential escalation levels and an associated interaction details field that is automatically pre-populated by the first processor based on Voice Over Internet Protocol transaction information;
   a relational database to receive solicited customer feedback audio information from the customer service representative terminal during the current interaction, along with a structured escalation level category entered via the analytics action, wherein the solicited customer feedback audio information is automatically parsed into unstructured text by a speech-to-text application;
   a predictive model platform to receive and analyze the unstructured text and thereby generate a customer feedback prediction; and
   a big data application platform coupled to the relational database, including:
      a second computer processor, and
      a second computer memory, storing instructions that, when executed by the second computer processor, cause the big data application platform to:
         (i) automatically execute an algorithm to assign a sub-category to the telephone call based on the unstructured parsed text and customer feedback prediction,
         (ii) record an indication of the solicited customer feedback into one of a positive sentiment pool, a neutral sentiment pool, and a negative sentiment pool, and
         (iii) automatically direct an insurance workflow associated with a customer feedback response during the current interaction.

15. The system of claim 14, wherein the survey platform is further configured to automatically transmit: (i) a confirmation email to the customer service representative, and (ii) a summary email to a manager associated with a plurality of customer service representatives.

16. The system of claim 14, wherein the big data application platform is associated with a Relational Database Management System server.

* * * * *